US006848078B1

United States Patent
Birsan et al.

(10) Patent No.: US 6,848,078 B1
(45) Date of Patent: Jan. 25, 2005

(54) COMPARISON OF HIERARCHICAL STRUCTURES AND MERGING OF DIFFERENCES

(75) Inventors: Dorian Birsan, Toronto (CA); Harm Sluiman, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,619

(22) Filed: Nov. 10, 1999

(30) Foreign Application Priority Data

Nov. 30, 1998 (CA) ............................................ 2255047

(51) Int. Cl.[7] .............................................. G06F 17/18
(52) U.S. Cl. ..................................... 715/511; 707/203
(58) Field of Search ............................... 715/511, 513, 715/514; 707/203

(56) References Cited

U.S. PATENT DOCUMENTS

| | | | | |
|---|---|---|---|---|
| 3,711,863 A | * | 1/1973 | Bloom | 714/38 |
| 5,438,661 A | * | 8/1995 | Ogawa | 345/804 |
| 5,708,806 A | * | 1/1998 | DeRose et al. | 707/104.1 |
| 5,806,074 A | * | 9/1998 | Souder et al. | 707/201 |
| 5,862,325 A | * | 1/1999 | Reed et al. | 709/201 |
| 5,956,726 A | * | 9/1999 | Aoyama et al. | 707/102 |
| 6,216,140 B1 | * | 4/2001 | Kramer | 715/511 |
| 6,226,652 B1 | * | 5/2001 | Percival et al. | 707/203 |
| 6,367,077 B1 | * | 4/2002 | Brodersen et al. | 717/170 |
| 6,466,240 B1 | * | 10/2002 | Maslov | 345/853 |
| 6,560,620 B1 | * | 5/2003 | Ching | 715/511 |

OTHER PUBLICATIONS

Chawathe et al, "Change Detection in Hierarchically Structured Information", Proceedings of the 1996 ACM SIGMOD International conference on Management of Data, Quebec Canada, 1996.*
Quin, Liam "Xentensible Markup Language (XML)" W3C, www.w3.org/XML, Jun. 10, 2003.*
Connolly, Dan "Development History" W3C www.w3.org/XML/hist2002 Jan. 6, 2003.*

* cited by examiner

Primary Examiner—Sanjiv Shah
(74) Attorney, Agent, or Firm—Scully Scott Murphy & Presser; Robert M. Trepp, Esq.

(57) ABSTRACT

A software tool to allow a user to compare a base file containing XML statements to a modified file and from the comparison, create a third file. The comparison between the base and modified files results in a comparison tree which contains, as nodes, all of the information in the base file as well as the differences located in the modified file. Differences between the nodes of the two files are highlighted in a comparison tree and the user may resolve the differences to create a third file or optionally incorporate the selected differences into the base file. As nodes are examined in the comparison tree and decisions made as to which nodes to include in the third file, differences in the comparison tree are resolved. As a difference is resolved, any node in the comparison tree dependent upon the now resolved difference is no longer highlighted if it too has had the difference resolved. The tool is most commonly used to determine changes made to a source code base file and allows the individual maintaining a stable source code base to determine if the changes in the modified file should be integrated into the base file.

27 Claims, 4 Drawing Sheets

```
⊟ ✗ <UserDefinedBusinessObject>
  ⊟ ✗ <BusinessObjectUnit>
    ⊟ ✗ <BOFile Name=PersonFile>
         <Uuid>
         <Comments>
         <IncludeFile>
      ⊟ ✗ <BOArtifact>
         ⊟ ✗ <Interface Name=Person>
              <Uuid>
              <IsQueryable>
              <IsWLM>
              <Comments>
              <InterfaceInheritance>
           ⊟ <Attribute Name=name>
                <Uuid>
                <Type>
                <Initializer>
                <Size>
                <Implementation>
                <Read-only>
                <Overridable>
                <UsedInImplementation>
                <StaticData>
           ⊟ ✗ <Attribute Name=age>
                <Uuid>
              ✗ <Type> --- CHANGED
                <Initializer>
                <Size>
                <Implementation>
                <Read-only>
                <Overridable>
                <UsedInImplementation>
                <StaticData>
           ⊟ ✗ <Attribute Name=address> --- REMOVED
              ✗ <Uuid> --- REMOVED
              ✗ <Type> --- REMOVED
              ✗ <Initializer> --- REMOVED
              ✗ <Size> --- REMOVED
              ✗ <Implementation> --- REMOVED
              ✗ <Read-only> --- REMOVED
              ✗ <Overridable> --- REMOVED
              ✗ <UsedInImplementation> --- REMOVED
              ✗ <StaticData> --- REMOVED

COMPARISON OF HIERARCHICAL STRUCTURES AND MERGING OF DIFFERENCES

BACKGROUND OF THE INVENTION

1. Technical Field

The present invention is a tool which compares two hierarchical data structures and produces a third hierarchical data structure indicating the differences between the two input data structures. The user may then traverse the third data structure and select the nodes of interest to create a new fourth data structure comprising components selected from the first and second data structures, based upon the differences highlighted in the third data structure. The preferred embodiment of the present invention provides this facility for XML files.

2. Prior Art

Data is often modeled using structures based upon hierarchy. For example, an XML (Extensible Markup Language) document has a tree hierarchy with the nodes being the element tags in the document. When changes are made between versions of an XML document, one may want to understand what the changes were. Also, in a multi-user environment, it is desirable to be able to merge multiple changes to a single document in a controlled manner.

Current tools which provide difference comparisons between files at the source level (e.g. UNIX diff) do not recognize the context of a hierarchy. Typically, they simply match strings within flat ASCII files.

Thus, there is a need for a software tool that will compare differences between hierarchical structures and provide the user with the ability to reconcile and understand the differences, and select which differences should be merged into the controlled base set of documents.

SUMMARY OF THE INVENTION

The present invention provides a method for identifying to a user, the differences between elements of two hierarchically structured files, comprising the steps of comparing the elements of a base file to the elements of a modified file; providing to the user a tree structure, said tree structure combining the elements of said base and said modified files; and highlighting the differences between said elements of said base and said modified files.

The method may further comprise the step of allowing the user to resolve said differences between elements, thereby creating a merged file containing elements from said base file and elements from said modified file. Said step of allowing the user to resolve said differences may include indicating to the user differences between elements by one of the identifiers: new, changed or removed. For an element identified as new, the method may provide the user with the following options: do not use the new element, whereby the new element is not incorporated into said merged file; and use the new element, whereby the new element and children thereof, if any, are incorporated into said merged file. The method may also include, for an element identified as changed, providing the user with the following options: use old, where conflict, whereby for the merged file the changed element is taken from the base file together with unresolved children thereof, if any; and use new, where conflict, whereby for the merged file the changed element is taken from the modified file together with unresolved children thereof, if any. And, for an element identified as removed, the method may also provide the user with the following options: do not delete, whereby the merged file has the element as it exists in the base file; and delete from the base file, whereby the merged file does not have the element that was deleted from the base file.

The method may also comprise visually displaying the tree structure. The visually displaying of the tree structure may also comprise displaying to the user a screen containing three panes, the first pane displaying said tree structure, the second pane displaying an element of said base file, and the third pane displaying an element of the modified file. Further, the method may include, when the user selects an element of the tree structure displaying in the first pane, displaying the source code for the selected element: in the second pane if the selected element exists in the base file; and in the third pane if the selected element exists in the modified file.

Further, the step of comparing may use an ID attribute of the elements of the base file and the modified file being compared. The step of comparing may also use a name attribute of the elements of the base file and the modified file being compared. Further, the step of comparing may use, when the hierarchically structured files are XML (extensible markup language) files, if provided by the elements of the base and modified files being compared, an attribute of type ID, or if an attribute of type ID is not provided by the elements of the base and modified files being compared, a <Uuid> tag if provided by the elements of the base and modified files being compared, or if an attribute of type ID and a <Uuid> tag is not provided by the elements of the base and modified files being compared, a name attribute if provided by the elements of the base and modified files being compared, or if an attribute of type ID, a <Uuid> tag and a name attribute is not provided by the elements of the base and modified files being compared, a concatenation of a tag of the element and a value of the element.

The hierarchically structured files of the method may be XML (extensible Markup Language) files.

The re is also provided a method for visually identifying to a user, the differences between elements of a hierarchical base data structure and a hierarchical modified data structure, comprising the steps of: comparing the elements of said base data structure to the elements of said modified data structure; displaying to the user a tree structure, said tree structure combining the elements of said base and modified data structures; and highlighting the differences between said elements of said base and modified data structure s.

There is also provided a program storage device readable by a data processing system, tangibly embodying a program of instructions, executable by said data processing system to perform the method steps of any of the foregoing method steps.

The present invention also provides a system for identifying to a user, the differences between elements of two hierarchically structured files, comprising means for comparing the elements of a base file to the elements of a modified file; means for providing to the user a tree structure, said tree structure combining the elements of said base and said modified files; and means for highlighting the differences between said elements of said base and said modified files.

The system may further comprise means for allowing the user to resolve said differences between elements, thereby creating a merged file containing elements from said base file and elements from said modified file. Said means for allowing the user to resolve said differences may include means for indicating to the user differences between elements by one of the identifiers: new, changed or removed. For an element identified as new, the system may provide means for providing the user with the following options: do not use the new element, whereby the new element is not incorporated into said merged file; and use the new element, whereby the new element and children thereof, if any, are incorporated into said merged file. The system may also include, for an element identified as changed, means for providing the user with the following options: use old, where conflict, whereby for the merged file the changed element is taken from the base file together with unresolved children thereof, if any; and use new, where conflict, whereby for the merged file the changed element is taken from the modified file together with unresolved children thereof, if any. And, for an element identified as removed, the system may also include means for providing the user with the following options: do not delete, whereby the merged file has the element as it exists in the base file; and delete from the base file, whereby the merged file does not have the element that was deleted from the base file.

The system may also comprise means for visually displaying the tree structure. The means for visually displaying of the tree structure may also means for displaying to the user a screen containing three panes, the first pane displaying said tree structure, the second pane displaying an element of said base file, and the third pane displaying an element of the modified file. Further, the system may include, when the user selects an element of the tree structure displaying in the first pane, means for displaying the source code for the selected element: in the second pane if the selected element exists in the base file; and in the third pane if the selected element exists in the modified file.

Further, the means for comparing may use an ID attribute of the elements of the base file and the modified file being compared. The means for comparing may also use a name attribute of the elements of the base file and the modified file being compared. Further, the means for comparing may use, when the hierarchically structured files are XML (extensible markup language) files, if provided by the elements of the base and modified files being compared, an attribute of type ID, or if an attribute of type ID is not provided by the elements of the base and modified files being compared, a <Uuid> tag if provided by the elements of the base and modified files being compared, or if an attribute of type ID and a <Uuid> tag is not provided by the elements of the base and modified files being compared, a name attribute if provided by the elements of the base and modified files being compared, or if an attribute of type ID, a <Uuid> tag and a name attribute is not provided by the elements of the base and modified files being compared, a concatenation of a tag of the element and a value of the element.

There is also provided a system for determining the differences between two hierarchically structured files comprising a parser to parse the files and produce a parse tree output for each file; a comparison module to compare the parse trees output from the parser and to create a merged tree from the parse tree outputs; and a tree view module to display the merged tree.

Also, a hierarchical data structure for use by a computer system and stored on a computer-readable storage medium is provided, said structure comprising a plurality of nodes; each of said nodes corresponding to a hierarchical element contained within a base file or a modified file, said files stored within said computer system; and each of said nodes having an indicator if said node is new, changed or removed when comparing the nodes of said base file to said modified file.

BRIEF DESCRIPTION OF THE DRAWINGS

Preferred embodiments of the present invention will now be described, by way of example only, with reference to the accompanying drawings in which:

FIG. 2 is a schematic diagram-illustrating the merged file structure tree resulting from the merging of the two structures represented in FIG. 1;

DETAILED DESCRIPTION OF THE PREFERRED EMBODIMENTS OF THE INVENTION

Figure 1:
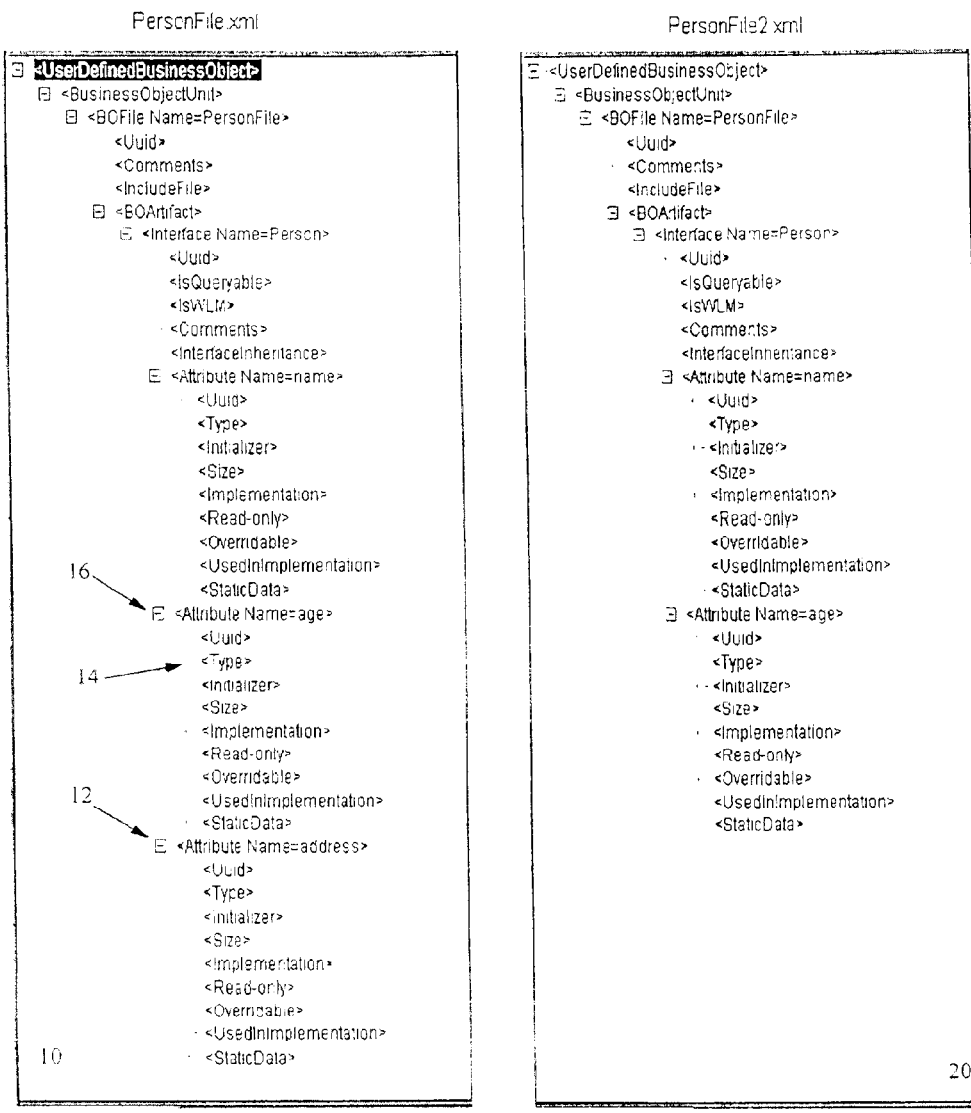
FIG. 1 is a schematic diagram illustrating a base file structure tree and a modified file structure tree.

A preferred embodiment of the present invention will be discussed in the context of how it is able to compare and merge XML documents. As can be appreciated by those skilled in the art, the present invention applies equally well to any set of hierarchical data structures.

In the preferred embodiment of the present invention, the hierarchy of an XML document is viewed as an inverted tree where each node represents an element of the data structure, where the root is the parent of the nodes at the next level, and so on. The rank of a node is its tree level. To each node is assigned an identity that is a function of node_s rank, the node order among its siblings and the node_s data content. A description of the method of determining identity follows later in this disclosure. A differencing tree is a tree with its identity on a node.

Comparison of structures becomes now a comparison of differencing trees, by concurrently walking the trees performing a match and compare algorithm to find differences between two such trees. The comparison produces a third tree, representing a merging of the initial two structures. In this merged structure, nodes are tagged relative to the first (base) structure and can be of the following types: unchanged, new, removed or changed. The new, removed and changed nodes are also called unresolved nodes.

1) Unchanged node: a node with the same identity in both trees, representing identical data in both structures;

2) New node: a node whose identity cannot be found in the first tree; the data it represents only appears in the second structure;

3) Removed node: a node whose identity cannot be found in the second tree; the data it represents only appears in the first structure; and 4) Changed node: a node with the same identity in both trees, having data that is different between the two structures.

Note that if a node is new, removed or changed, then its parent (and its parent, and so on up the hierarchy) is unresolved.

The second part of the comparison process is the merging of differences. This is accomplished by the user selecting nodes that show differences (i.e. nodes that are tagged as new, removed or changed). The goal is to resolve differences at each changed, new, or removed node, by choosing to select data from either of the two structures being compared, and incorporating the selected data into a merged structure.

In this context, a user can equally be a human operator, another software tool, a hardware device or any other means for providing the input required for the invention including the selection of nodes and/or the provision of the structures.

When the user makes a decision as to whether to include or exclude an unresolved node in the hierarchy of the merged structure, changes are propagated down to the child nodes, as if a similar decision has been made on each child node in the substructure. This propagation is also sent up the hierarchy to all the parents of the current node, so that when the parent has no unresolved children then the parent becomes resolved, and then the same procedure applies to the parent of the parent, and so on.

Referring now to FIG. 1, a user has edited a base file named __PersonFile.xml__, having base file structure tree 10. The editing created a modified file named PersonFile1.XML, having modified file structure tree 20. The editing involved removing the attribute __address__ 12 and changing the __type__ 14 of element __age 16 from long to short (not shown).

FIG. 1 illustrates the trees representing the structure of the two XML files. Note that not all of the data is explicitly shown, but rather only the node structure.

After determining the differences between base file structure tree 10 and modified file structure tree 20, the resulting new tree is shown in FIG. 2 as merged file structure tree 30. The unresolved nodes have a crossbar (an X). The nodes without the NEW (not shown), CHANGED, or REMOVED indicators are unchanged. An XML file contains a plurality of elements that can be equated to a node in a tree. Each node or element may have zero or more elements. Thus the XML statement <Attribute type=__integer__> defines an element named __attribute__ having a single attribute, named __type__. The value of the attribute __type__is __ integers. As can be seen in FIG. 2, removal of the attribute __address__ is shown by crossbars next to the <Attribute Name=address> node and its child nodes along with an indication that those nodes are __REMOVED__. Crossbars are also propagated to the parent nodes to indicate that those nodes are unresolved because a child node—in this case, the <Attribute Name=address> node—is unresolved. Further, the change of __type__ of element __age__ from long to short is shown by a crossbar next to the <Type> node underneath the <Attribute Name=age> node along with an indication that that node is __CHANGED__. Crossbars are also propagated to the parent nodes of that <Type> node to indicate that those parent nodes are unresolved also because a child node is unresolved (although such a propagation is redundant in this case due to the previous propagation).

The simplest usage of the preferred embodiment of the present invention is to visualize the differences between the structure of two XML files, as illustrated in the merged file structure tree 30. However, the most useful feature is to merge the differences into a new XML file as directed by the user.

The preferred embodiment of the present invention does not function at file level, but rather at a higher level, the XML element level. The invention displays a __merged__ tree, in which all the elements of the two input files are shown in a hierarchical tree display with the modified nodes tagged appropriately. For example, if an interface had one attribute in the first XML file, but there is a new attribute added in the second file, the interface node would be marked as changed, and it will contain two child nodes, one for each attribute, with one node being unchanged, and the other marked as new. The user may then traverse the changed nodes and make a decision whether the change should be picked from the base file or from the modified file. Each node in the tree will have an associated pop-up menu (the menu bar can also be used) to allow the user to perform the desired action. The changes will be automatically propagated up and down the tree, so that the user won__t need to individually go to each node if a global decision can be made. For example, it a new node was selected as to be part of the merged file, then all its children will also be in the merged file; in addition, if this was the only node with a conflict under its parent, then the parent would be marked as resolved, and so on. The user has also the ability to undo repeatedly, to the last time the work was saved.

Figure 3:
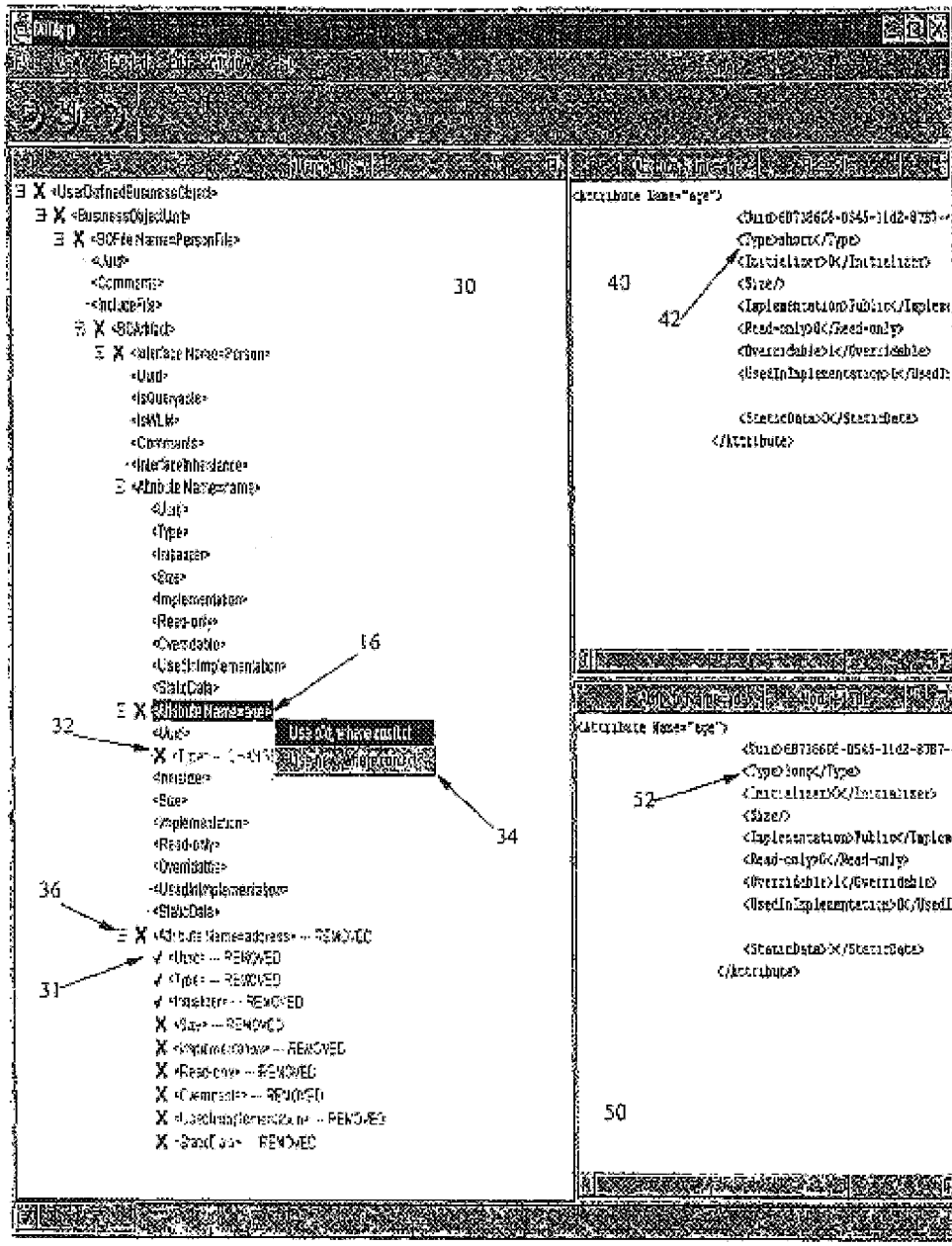
FIG. 3 is a screen capture of a user interface illustrating the merged file structure tree of FIG. 2, as well as portions of the base file structure tree and modified file structure tree of FIG. 1.

FIG. 3 is a screen capture of a user interface illustrating the merged file structure tree of FIG. 2, as well as portions of the base file structure tree and modified file structure tree of FIG. 1. In the left pane of FIG. 3, the merged file structure tree 30 contains the differences in the XML elements of base file structure tree 10 and modified file structure tree 20, as determined by a comparison of the base file structure tree 10 to the modified file structure tree 20. In the preferred embodiment the removed nodes are colored in red, the changed nodes in magenta and the new nodes in blue. Everything else is black. All the modified nodes receive a crossbar X as a node icon. After the user decides on which version of the node contents to select, the crossbar is replaced by a blue checkmark. Nodes with checkmarks (e.g. UUID node 31) will no longer have the pop-up menu available. The user can undo the changes at any time. Optionally, the user can selectively undo certain changes.

The right panes of FIG. 3 show the content of a XML node selected from the left pane, in this case the content of the element __age__ 16. The top pane 40 displays the content of the element __age__16 as it appears in the source code of the base file, the bottom pane 50 is for the same element in the modified file. As shown base attribute 42 in top pane 40 has a type of short, while modified attribute 52 has a type of long. Both tags 42 and 52 are part of element __age__ 16 and have different values, thus the reason for the crossbar X, and highlighting of changed type attribute 32 in merged file structure tree 30. When the node selected is a new or deleted node, only one of the two panes will have content.

When the user exits the application (or at any time when clicking on the save button/menu item) the merged changes are written to a specified XML file. Changes that were not resolved (i.e. nodes with an X) will be resolved as in the base file.

Once the user has a display of the combined XML files as shown in merged file structure tree 30 of FIG. 3, the user may traverse the changed nodes and decide whether the change should be incorporated in a new merged file from either the base file, or the modified file.

Every modified node in the merged file structure tree 30 has an associated pop-up menu 34, that provides choices that enable the user to implement the decision whether to incorporate properties from either the base file, or the modified file.

A new node has the following pop-up menu choices:
1) Do not use new: the new node is not incorporated in the merged file; and
2) Use new element: the merged file incorporates the new node, and its children, if any, as they are in the modified file.

A removed node (e.g. removed node 36) has the following pop-up menu choices:
1) Do not delete: the merged file incorporates the node as it exists in the base file; and 2) Delete from base file: the merged file does not incorporate the node that was deleted from the base file.

A changed node (e.g. element __age__ 16) has the following pop-up menu choices:

1) Use old, where conflict: the merged file incorporates the node as it exists in the base file for the current node, and any of its unresolved children (those modified child nodes for which the user has not made a decision about incorporation in the merged file yet); and 2) Use new, where conflict: the merged file incorporates the node as it exists in the modified file for the current node, and any of its unresolved children.

The above listed choices are also available from the Selected menu.

To merge the two XML files, the user executes the following steps:

1) Select one of the highlighted nodes in the merged file structure tree 30.

2) Select Use modified (new) file for node and unresolved children from the pop-up menu of the node if the user wants to have the merged file incorporate the changes that were made in the modified XML file. Select Use base (old) file for node and unresolved children from the pop-up menu of the node if the user wants to have the merged file have the older or base version of the corresponding node.

3) Use Edit—Undo to undo all of the users actions up to the last time the user saved their work.

When comparing XML files, the user selects the base and the modified XML files. Using an XML parser the two files are parsed and the two parse trees obtained. Each node in the tree corresponds to an element in the XML document.

The two trees are being walked in parallel, starting from the root and at each level nodes are matched from the two trees and added to a merged tree (or comparison tree) and tagged appropriately (new, removed, changed, same).

The identity function is based on the node__s position in the tree, its ID attributes or its direct content. The identity function can be anything the user wants and can be customized. In the preferred embodiment of the present invention, the identity function is designed to uniquely identify XML elements. The tool determines the identity of a node by examining certain attributes in the following manner.

A tree (representing an XML file structure) is a tree of XML elements, each element having zero or more attributes. Firstly, all the attributes of an element are examined to determine whether there is any attribute of type ID. XML defines a type ID for an attribute and a valid XML document should enforce that no two elements have attributes with the same ID, i.e. the values of the ID attributes must be unique in an XML document. If such an ID attribute is found, then the identity is the value of the attribute (guaranteed to be unique in that document). If, there is no ID attribute, the direct children of this node are examined and checked to determine whether there is one with a tag called <Uuid>. If one is found, then its value is taken (i.e. the text content of the Uuid element, which is an Open Software Foundation's Distributed Computing Environment (DCE) compliant universally unique identifier) and used as the node identity.

If none of the above is successful, look for an attribute of the element represented by the node with a name equal to __Name__. If one is found, use it as the node identity.

Last, if none of the above steps provide a node identity, then take the text contained within this element, and concatenate it with the element tag and use it as the identity of the node. The tag is the name of the element e.g. in <Title>My Book</Title>, the tag name is __Title__.

To allow for different ordering of nodes within a level, the dependency of the order among siblings may be ignored in identity, in which case an assumption is made that the node__s different among sibling nodes.

The following algorithm is used to construct the merged file structure tree 30:

Root1=root of the base tree
Root2=root of the modified tree
Root3=new root for merged tree
Compare (root1, root2, root3):

```
For each child of root1 {
    If there is no child of root2 with the same
    identity then add this child to root3 and tag it as REMOVED.
        Then add the whole subtree rooted at this
        child to the merged tree and mark all the
        nodes as REMOVED (since their parent node was removed).
} Else {
    If there is a child of root2 with same identity
        then check the content of the two child nodes
        (XML attributes and text).
    If there are differences,
        mark the root1 child node as changed
        i.e. children changed) and add it to the merged tree.
    }
}
```

Once all the children of the root1 have been examined the roles are reversed and each child of root2 is examined to determine if it appears as a child of the root1 node (i.e. root1 has a child with the same identity). Those that are not found are marked as NEW and added to the merged tree. Also, the subtrees rooted at these nodes are added (and tagged as NEW) to the merged tree.

When all the children of root1 and root2 have been examined, the trees are recursively traversed using the same process to ensure that any descendants that may have been changed, removed or new are also identified.

The recursion algorithm is as follows:

For each child1 of root1
    For each child2 of root2
        For each node added in the merged tree (caused by comparing child1 and child2)
            Compare (child1, child2, node)

Figure 4:
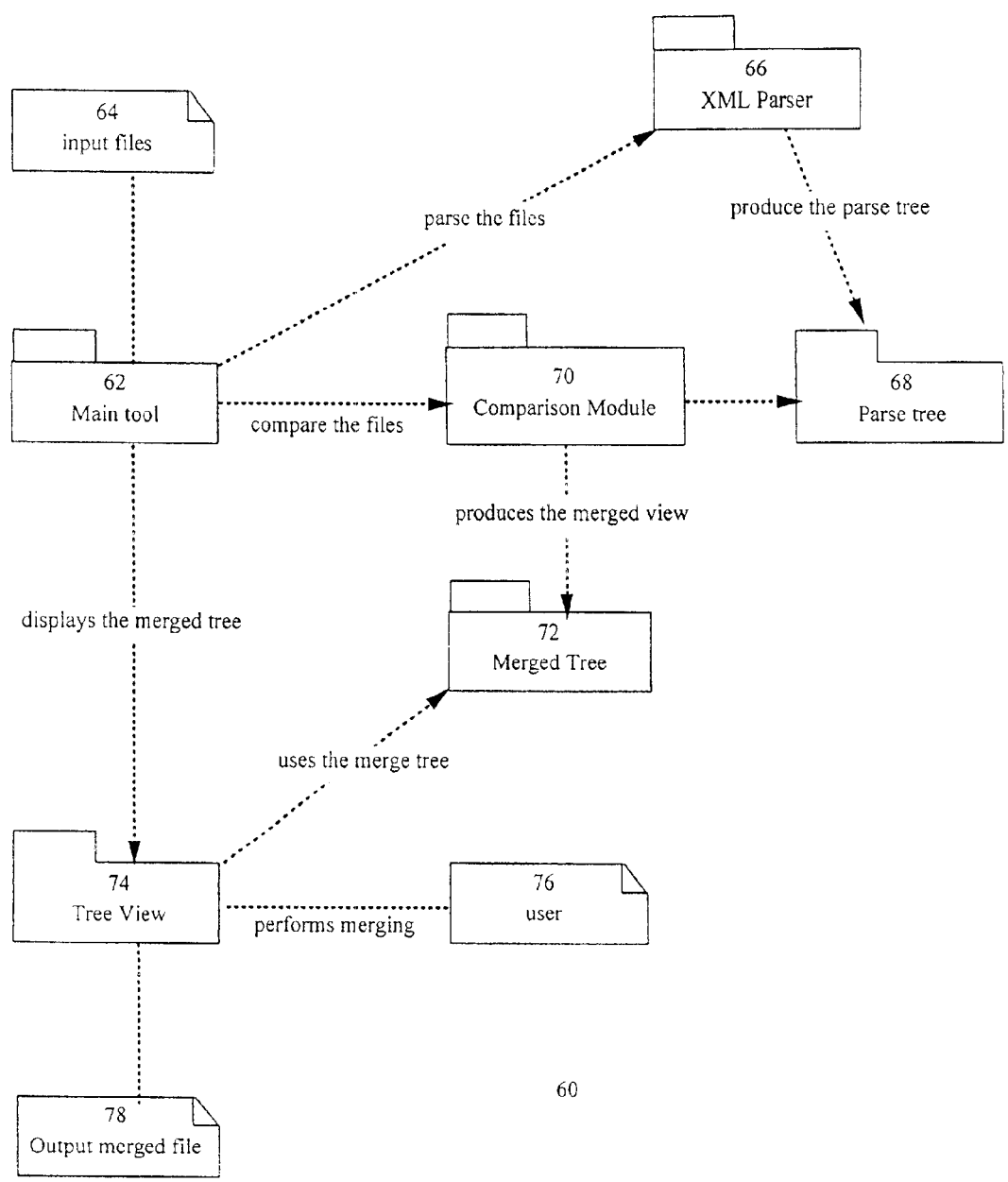
FIG. 4 is a schematic diagram illustrating the components of a preferred embodiment of the present invention.

Referring now to FIG. 4, a schematic diagram illustrating the components of the preferred embodiment of the present invention. The preferred embodiment of the present invention shown generally as 60 comprises a main tool 62 which coordinates the comparison and display of the input files 64. Main tool 62 first passes each of the two input files 64 to the XML parser 66. As recognized by one skilled in the art, the use of the XML parser 66 is based solely upon the fact that for the purposes of this embodiment the input files 64 comprise XML source code. The XML parser 66 produces as output a parse tree 68 for each of the input files 64. Once the parsing of the input files 64 is completed, the main tool 62 invokes the comparison module 70 to compare the contents of the parse trees 68. The comparison module 70 then creates a merged tree 72 combining the elements of the two parse trees 68. The tree view module 74 then displays the merged tree 72 in the format illustrated in FIG. 3. The user 76 then interacts with the tree view 74 as shown in FIG. 3 to determine which elements of the merged tree 72 are to be selected to create the output merged file 78. As is readily apparent to those skilled in the art, any or all of these components may be integrated into one tool or may each be separate tools that are interconnected or stand-alone.

The XML parser 66 has a digest function which encodes all of the information about an XML element and all of its descendants. This digest function can be used to determine whether two elements are identical or not. This aids in identifying changed elements even though they appear to be the same when their attributes are initially examined. As discussed, a changed node is caused by either changes to the attributes of an element or changes to one of its descendants. Thus, although a change will always be identified, the ability to recognize a change at a higher level of the tree allows an element to be identified as changed at that point.

The invention may be implemented on a stand-alone basis, integrated into an application wherein the invention is a feature such as an integrated software development environment or integrated into an application to further process the results of the analysis and/or provide the variable inputs including the trees to be analyzed or the decisions on whether to incorporate into a merged file element(s) from the base file or from the modified file.

The invention may be implemented as a program storage device readable by a data processing system, tangibly embodying a program of instructions, executable by said data processing system to perform the method steps of the invention. Such a program storage device may include diskettes, optical discs, tapes, CD-ROMS, hard drives, memory including ROM or RAM, computer tapes or other storage media capable of storing a computer program.

The invention may also be implemented in a computer system. In a preferred embodiment, a system is provided comprising a computer program operating on a data processing system, with the computer program embodying the method of the invention and producing an output of the method on a display or output device. Data processing systems include computers, computer networks, embedded systems and other systems capable of executing a computer program. A computer includes a processor and a memory device and optionally, a storage device, a video display and/or an input device. Computers may equally be in standalone form (such as the traditional desktop personal computer) or integrated into another apparatus (such as a cellular telephone).

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for identifying to a user, the differences between elements of two hierarchically structured files, comprising the steps of:
   comparing the elements of a base file to the elements of a modified file;
   displaying to the user a tree structure, said tree structure combining the elements of said base and said modified files;
   highlighting, in the tree structure, the differences between said elements of said base and said modified files;
   allowing the user to resolve said differences between elements, thereby creating a merged file containing elements from said base file and elements from said modified file;
   indicating to the user, in the tree structure, differences between elements by one of the identifiers: new, changed or removed; and
   for an element identified as new, providing the user with the following options:
   a) do not use the new element, whereby the new element is not incorporated into said merged file; and
   b) use the new element, whereby the new element and children thereof, if any, are incorporated into said merged file.

2. The method of claim 1, wherein displaying the tree structure comprises displaying to the user a screen containing three panes, the first pane displaying said tree structure, the second pane displaying an element of said base file, and the third pane displaying an element of the modified file.

3. The method of claim 2 which includes, when the user selects an element of the tree structure displayed in the first pane, displaying the source code for the selected element:
   a) in the second pane if the selected element exists in the base file; and
   b) in the third pane if the selected element exists in the modified file.

4. The method of claim 1 wherein the step of comparing uses an ID attribute of the elements of the base file and the modified file being compared.

5. The method of claim 1 wherein the step of comparing uses a name attribute of the elements of the base file and the modified file being compared.

6. The method of claim 1 wherein said hierarchically structured files are XML (extensible Markup Language) files.

7. A program storage device readable by a data processing system, tangibly embodying a program of instructions, executable by said data processing system to perform the method steps of claim 1.

8. The method of claim 1, wherein:
   the step of comparing comprises comparing information associated with at least one of the elements of the base file with information associated with at least one of the elements of the modified file;
   the information associated with the at least one of the elements of the base file identifies attributes of the at least one of the elements of the base file; and
   the information associated with the at least one of the elements of the modified file identifies attributes of the at least one of the elements of the modified file.

9. The method of claim 8, wherein:
   the information associated with the at least one of the elements of the base file further identifies attributes of descendant elements thereof, if any;
   the information associated with the at least one of the elements of the modified file further identifies attributes of descendant elements thereof, if any.

10. The method of claim 8, wherein:
    the information associated with the at least one of the elements of the base file comprises information encoded by a digest function; and
    the information associated with the at least one of the elements of the modified file comprises information encoded by the digest function.

11. The method of claim 1, further comprising:
    identifying at least one of the elements of the base file and the modified file according to a user-customizable identity function.

12. A system for identifying to a user, the differences between elements of two hierarchically structured files, comprising:
    means for comparing the elements of a base file to the elements of a modified file;
    means for displaying to the user a tree structure, said tree structure combining the elements of said base and said modified files;

means for highlighting, in the tree structure, the differences between said elements of said base and said modified files;

means for allowing the user to resolve said differences between elements, thereby creating a merged file containing elements from said base file and elements from said modified file;

means for indicating to the user, in the tree structure, differences between elements by one of the identifiers: new, changed or removed; and for an element identified as new, means for providing the user with the following options:

a) do not use the new element, whereby the new element is not incorporated into said merged file; and b) use the new element, whereby the new element and children thereof, if any, are incorporated into said merged file.

13. The system of claim 12, wherein the means for displaying the tree structure comprises means for displaying to the user a screen containing three panes, the first pane displaying said tree structure, the second pane displaying an element of said base file, and the third pane displaying an element of the modified file.

14. The system of claim 13 which includes, when the user selects an element of the tree structure displayed in the first pane, means for displaying the source code for the selected element:

a) in the second pane if the selected element exists in the base file; and b) in the third pane if the selected element exists in the modified file.

15. The system of claim 12 wherein the means for comparing uses an ID attribute of the elements of the base file and the modified file being compared.

16. The system of claim 12 wherein the means for comparing uses a name attribute of the elements of the base file and the modified file being compared.

17. The system of claim 12 wherein said hierarchically structured files are XML (extensible Markup Language) files.

18. The system of claim 12, wherein:

the means for comparing comprises means for comparing information associated with at least one of the elements of the base file with information associated with at least one of the elements of the modified file;

the information associated with the at least one of the elements of the base file identifies attributes of the at least one of the elements of the base file; and the information associated with the at least one of the elements of the modified file identifies attributes of the at least one of the elements of the modified file.

19. The system of claim 18, wherein:

the information associated with the at least one of the elements of the base file further identifies attributes of descendant elements thereof, if any;

the information associated with the at least one of the elements of the modified file further identifies attributes of descendant elements thereof, if any.

20. The system of claim 18, wherein:

the information associated with the at least one of the elements of the base file comprises information encoded by a digest function; and the information associated with the at least one of the elements of the modified file comprises information encoded by the digest function.

21. The system of claim 12, further comprising:

means for identifying at least one of the elements of the base file and the modified file according to a user-customizable identity function.

22. A method for identifying to a user, the differences between elements of two hierarchically structured files, comprising the steps of:

comparing the elements of a base file to the elements of a modified file;

displaying to the user a tree structure, said tree structure combining the elements of said base and said modified files;

highlighting, in the tree structure, the differences between said elements of said base and said modified files;

allowing the user to resolve said differences between elements, thereby creating a merged file containing elements from said base file and elements from said modified file;

indicating to the user, in the tree structure, differences between elements by one of the identifiers: new, changed or removed; and for an element identified as changed, providing the user with the following options:

a) use old, where conflict, whereby for the merged file the changed element is taken from the base file together with unresolved children thereof, if any; and b) use new, where conflict, whereby for the merged file the changed element is taken from the modified file together with unresolved children thereof, if any.

23. A method for identifying to a user, the differences between elements of two hierarchically structured files, comprising the steps of:

comparing the elements of a base file to the elements of a modified file;

displaying to the user a tree structure, said tree structure combining the elements of said base and said modified files;

highlighting, in the tree structure, the differences between said elements of said base and said modified files;

allowing the user to resolve said differences between elements, thereby creating a merged file containing elements from said base file and elements from said modified file;

indicating to the user, in the tree structure, differences between elements by one of the identifiers: new, changed or removed; and for an element identified as removed, providing the user with the following options:

a) do not delete, whereby the merged file has the element as it exists in the base file; and b) delete from the base file, whereby the merged file does not have the element that was deleted from the base file.

24. A method for identifying to a user, the differences between elements of two hierarchically structured files, comprising the steps of:

comparing the elements of a base file to the elements of a modified file;

displaying to the user a tree structure, said tree structure combining the elements of said base and said modified files; and highlighting, in the tree structure, the differences between said elements of said base and said modified files;

wherein said hierarchically structured files are XML (eXtensible markup language) files and wherein the step of comparing uses:

if provided by the elements of the base and modified files being compared, an attribute of type ID;

if an attribute of type ID is not provided by the elements of the base and modified files being compared, a <Uuid> tag if provided by the elements of the base and modified files being compared;

if an attribute of type ID and a <Uuid> tag is not provided by the elements of the base and modified files being compared, a name attribute if provided by the elements of the base and modified files being compared; and if an attribute of type ID, a <Uuid> tag and a name attribute is not provided by the elements of the base and modified files being compared, a concatenation of a tag of the element and a value of the element.

25. A system for identifying to a user, the differences between elements of two hierarchically structured files, comprising:

means for comparing the elements of a base file to the elements of a modified file;

means for displaying to the user a tree structure, said tree structure combining the elements of said base and said modified files;

means for highlighting, in the tree structure, the differences between said elements of said base and said modified files;

means for allowing the user to resolve said differences between elements, thereby creating a merged file containing elements from said base file and elements from said modified file;

means for indicating to the user, in the tree structure, differences between elements by one of the identifiers: new, changed or removed; and for an element identified as changed, means for providing the user with the following options:

a) use old, where conflict, whereby for the merged file the changed element is taken from the base file together with unresolved children thereof, if any; and b) use new, where conflict, whereby for the merged file the changed element is taken from the modified file together with unresolved children thereof, if any.

26. A system for identifying to a user, the differences between elements of two hierarchically structured files, comprising:

means for comparing the elements of a base file to the elements of a modified file;

means for displaying to the user a tree structure, said tree structure combining the elements of said base and said modified files;

means for highlighting, in the tree structure, the differences between said elements of said base and said modified files;

means for allowing the user to resolve said differences between elements, thereby creating a merged file containing elements from said base file and elements from said modified file;

means for indicating to the user, in the tree structure, differences between elements by one of the identifiers: new, changed or removed; and for an element identified as removed, means for providing the user with the following options:

a) do not delete, whereby the merged file has the element as it exists in the base file; and b) delete from the base file, whereby the merged file does not have the element that was deleted from the base file.

27. A system for identifying to a user, the differences between elements of two hierarchically structured files, comprising:

means for comparing the elements of a base file to the elements of a modified file;

means for displaying to the user a tree structure, said tree structure combining the elements of said base and said modified files; and means for highlighting, in the tree structure, the differences between said elements of said base and said modified files;

wherein said hierarchically structured files are XML (eXtensible markup language) files and wherein the means for comparing uses:

if provided by the elements of the base and modified files being compared, an attribute of type ID;

if an attribute of type ID is not provided by the elements of the base and modified files being compared, a <Uuid> tag if provided by the elements of the base and modified files being compared;

if an attribute of type ID and a <Uuid> tag is not provided by the elements of the base and modified files being compared, a name attribute if provided by the elements of the base and modified files being compared; and if an attribute of type ID a <Uuid> tag and a name attribute is not provided by the elements of the base and modified files being compared, a concatenation of a tag of the element and a value of the element.

* * * * *